June 20, 1933.  G. O. HILLIER  1,914,742
FILTER AND METHOD OF OPERATION
Filed Jan. 7, 1931  2 Sheets-Sheet 1

INVENTOR.
Gerald O. Hillier
BY
ATTORNEYS.

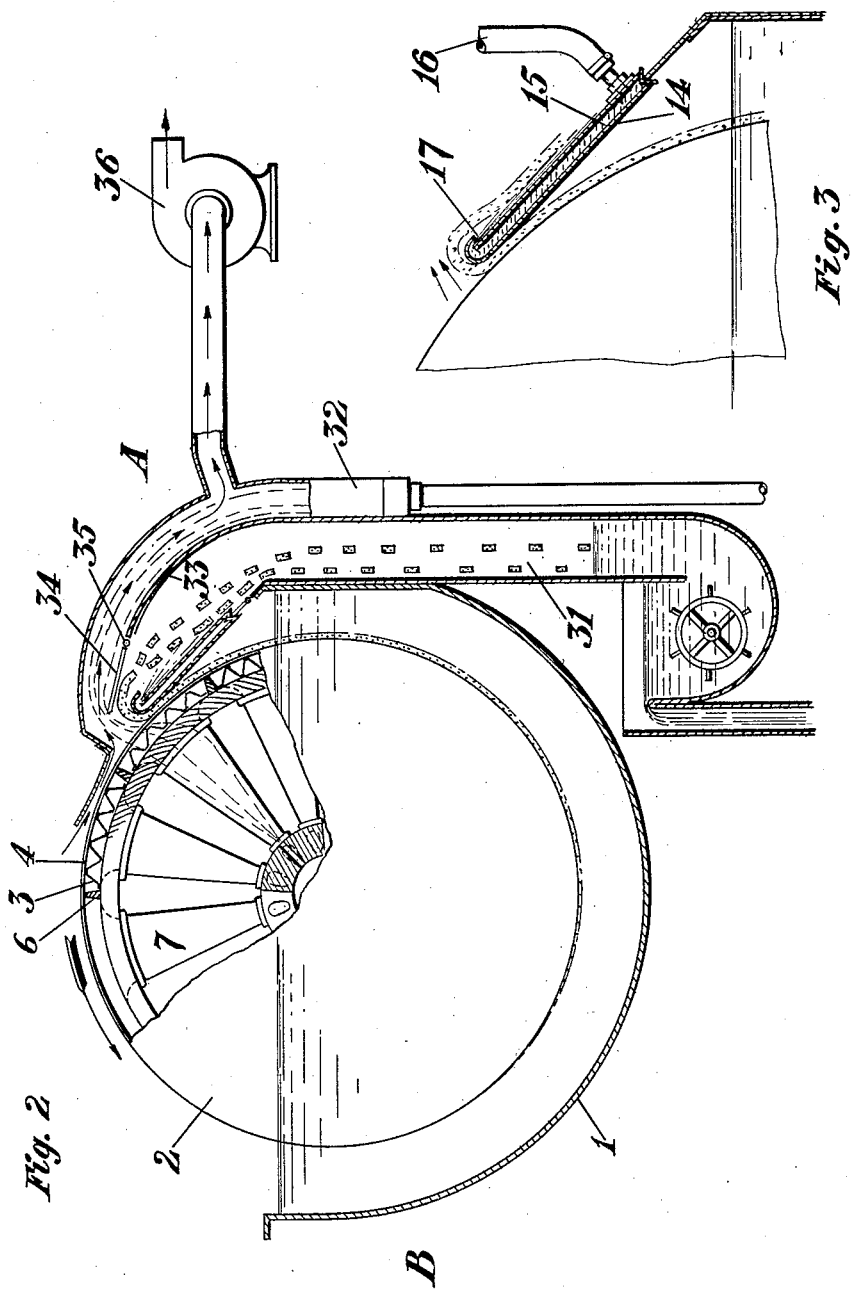

Patented June 20, 1933

1,914,742

UNITED STATES PATENT OFFICE

GERALD O. HILLIER, OF BERKELEY, CALIFORNIA, ASSIGNOR TO OLIVER UNITED FILTERS INC., OF SAN FRANCISCO, CALIFORNIA, A CORPORATION OF NEVADA

FILTER AND METHOD OF OPERATION

Application filed January 7, 1931. Serial No. 507,115.

This invention relates to continuous filters and particularly to means and methods of discharging such filters and cleaning the discharged filter medium.

There are various means now available for discharging rotary drum and disc filters such as for example scrapers or doctors, couch rolls, strings or belt dischargers and fluid jets for cutting the cake from the filter medium. All of these discharging mechanisms are sometimes aided by the application of a blow back or reverse pressure to the inside surface of the filter cloth or medium. The character or type of the discharging mechanism selected of course depends upon the character of the material being filtered. In the case of slimy cakes a scraper cannot be successful'y used for it forces the inner layer or film of cake into the interstices of the filter medium thereby blinding it. Couch rolls are often times used where it is impractical to use scrapers but since couch rolls must of necessity bear upon the cake and its supporting filter medium with great pressure, the filter medium is subjected to undue wear and tear. Jets of water are sometimes effectively used in cutting and washing the cake from the filter medium but the use of additional water for this purpose dilutes the cake, represents an appreciable power consumption and is wearing on the filter medium.

Ordinarily the discharged filter medium is cleaned by rotating brushes, liquid sprays and air and/or steam blow backs. Brushes and liquid sprays are wearing on the filter medium and since the liquid used for spraying goes directly to the filter vat the total amount of material handled by the filter is increased. The use of steam represents power consumption and is therefore expensive.

Taking everything into consideration there is a great need for improving the present methods and means of discharging and washing or cleaning continuous filters.

In general then the object of my invention is to provide for the discharge of the cake formed by continuous filters, irrespective of their specific type, and in such a manner as to minimize power consumption and wear of the filter cloth as caused by the known types of dischargers such as couch rolls, scrapers and other mechanical devices and at the same time provide for the continuous cleaning of the filter medium without recourse to shower pipes, hoses, scrapers or other methods having a tendency to dilute the pulp in the filter vat, or cause undue wear on the covers.

More specifically one of the objects of my invention consists in the method and apparatus for discharging a continuous rotary filter wherein the filter element is passed into a fluid current passing outwardly thru the filter element to thereby lift the cake continuously therefrom.

Another object of my invention consists in a method and means for washing the filter medium of a continuous rotary filter by moving the filter element through an air current passing outwardly thru the filter element and in which is entrained a quantity of residual filtrate.

Still another object of my invention resides in stripping the cake from its supporting medium, and simultaneously separating it from a portion of the residual moisture associated with it and segregating or classifying the cake and moisture.

My invention possesses other advantageous features, some of which with the foregoing will be set forth at length in the following description where I shall outline in full that form of my invention which I have selected for illustrations in the drawings accompanying and forming part of the present specification. In said drawings, I have shown two forms of cake dischargers by which the method of my invention may be carried out, but it is to be understood that I do not limit myself to such forms, since the invention as set forth in the claims, may be embodied in a plurality of forms.

Briefly my invention which may in the form disclosed, be termed a suction discharger, comprises an open ended suction chamber supported adjacent to the rotary drum and provided with means for sealing two of the opposite edges of its open end, respectively against the advancing cake and against a portion of discharged drum.

Figure 2 is an end elevation of a rotary drum filter provided with a modified form of suction discharger and having certain parts broken away and in section to illustrate more clearly its construction and operation.

Figure 3 is an enlarged detail of the seal or lip used for sealing one edge of the open end of the suction dischargers shown in Figs. 1 and 2 against the advancing cake or against the receding discharged filter medium.

Figure 1:
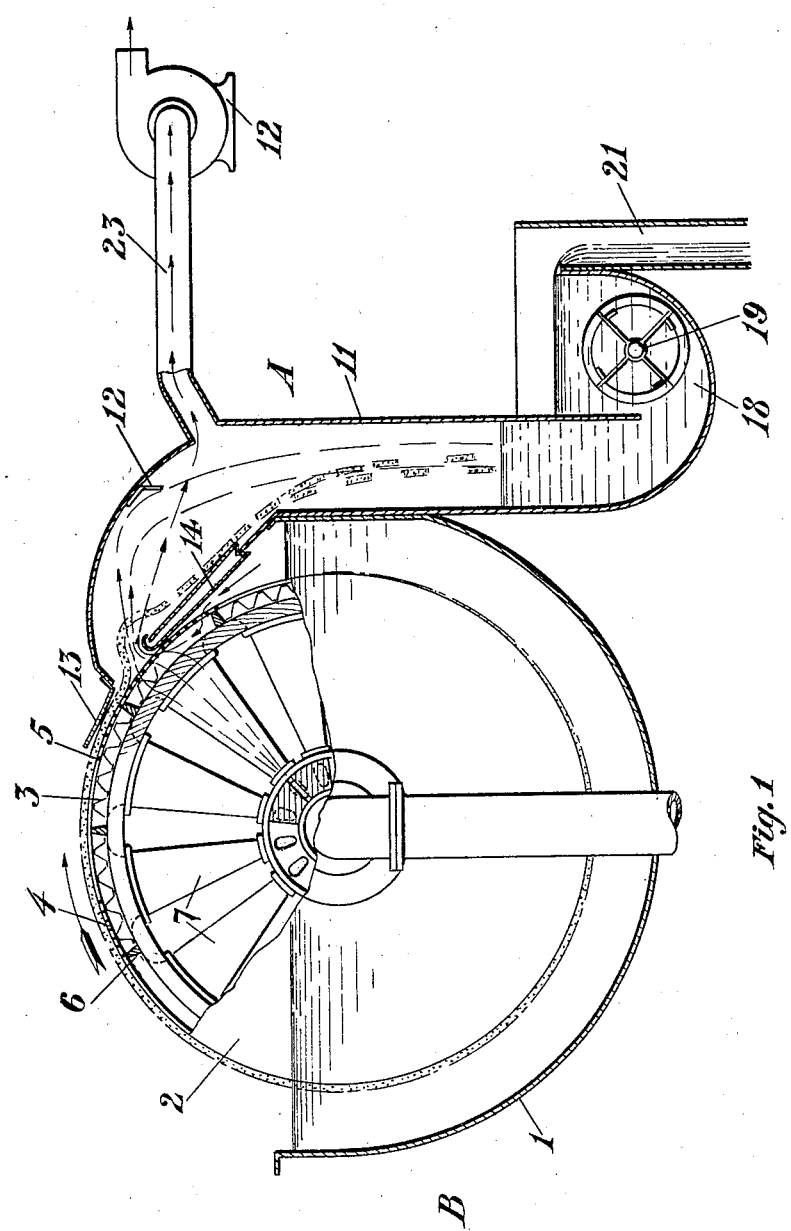
Figure 1 is an end elevation with parts broken away and partly in section, of a rotary drum filter provided with a suction discharger.

In Figures 1 and 2 a suction discharger which may be generally designated as A, has been shown in combination with a rotary drum filter B of any standard make, such as for example an Oliver.

Rotary drum filters of this type consist briefly in a pulp tank or vat 1 within which is rotatably secured a sectionalized drum 2. The periphery of the drum 2 is provided with suitable grids or drainage members 3 over which is disposed a screen member 4 for supporting the filter cloth or medium 5. Division strips 6 serve to sectionalize the periphery of the drum and conduits 7 establish communication between the various sections of the drum and suitable valve ports carried by the drum trunnion. Since the construction of a rotary drum filter is well known to the trade and since the structural features of the filter per se form no part of my invention it is believed that the above description is sufficient to show clearly the operative and structural relations between a filter of this type and my suction discharger.

The suction discharger A disclosed in Figure 1 comprises a suction chamber 11 supported adjacent to the filter B and in communication with any suitable source of suction such as for example the exhauster 12. The upper end of the chamber 11 is provided with an opening in registration with that portion of the filter medium 5 which is to be discharged. A flexible or resilient seal or lip 13 secured to the upper edge of this opening serves to seal the chamber 11 against the upper surface of the cake supported by and rotatively advancing with the filter medium. To the lower and opposite edge of the opening in the chamber 11 is resiliently secured a seal or lip 14 which serves to seal this lower edge against the receding discharged filter medium.

A spiral wire winding aids in securing the filter cloth or medium to the rotary drum of a great many filters of the Oliver type and when a wire winding of this nature is used, it supports the lip or seal 14 and spaces it slightly from the filter cloth. As best shown in Figure 3 the lip or seal 14 is provided with a chamber or passageway 15 in communication with a source of liquid 16. The upper edge of the seal 14 is slotted as at 17 thereby permitting the upper surface of the seal to be lubricated by a sheet of water continuously flowing from the slot 17. Obviously the purpose of this feature is to prevent the discharged cake from sticking to the seal.

The lower end of the suction chamber 11 forms or terminates in a seal box 18 provided with a scroll agitator 19 and an overflow box 21.

The operation of this device is as follows: The drum 2, operating in a manner well known in the art, accumulates a cake on its surface which is partially or totally dried before it passes beneath the lip or seal 13. Before each successive compartment comes into registration with the open end or mouth of the suction chamber 11 it is relieved from the action of vacuum and is vented to atmosphere by means of a suitable port in the filter valve. The exhauster 12 creates a current of fluid starting partly from a point external to the drum and beneath the seal 14, passing into the compartment being discharged and then outwardly thru the same compartment and between the seals 13 and 14 as indicated by the arrows. Since the compartment being discharged is open to atmosphere thru the filter valve there is also set up a fluid current from within the compartment and which merges with the fluid current just described. The direction then of that portion of the fluid current traveling within the drum 2 may be considered as fixed. As the advancing cake passes beneath the lip 13 and enters the mouth of the suction discharger, it engages the fluid current just described and in so doing is lifted from the drum and carried into the suction chamber where it falls by gravity over the lubricated face of the lip 14 and into the seal box 18. From the seal box 18 the diluted cake overflows to any desired subsequent treatment.

Although during the cake forming and drying period most of the filtrate entering each compartment is drained therefrom by the conduits 7 there still remains in each compartment a small quantity of residual filtrate. A portion of this residual filtrate is entrained in the fluid current set up by the exhauster 12 and not only aids in lifting the cake from the filter medium but also serves to wash the filter medium from its under side.

The action of this suction discharger is to be differentiated from the action of the well known blow back. In the latter a fluid current is passed outwardly thru the filter medium and against the cake to loosen the cake from the filter medium while in the former the cake moves transversely into a fluid current which passes thru the filter medium into the suction discharger. In the ordinary blow back there is no relative transverse motion between the blow back current and the cake for both have the same rotational motion. This distinction is particularly pointed out inasmuch as this is one manner which has been relied upon to distinguish the invention as defined by the appended claims from the prior art as known to the applicant.

In the modification shown in Figure 2 it is to be noted that the direction of rotation of the rotary drum 2 is counterclockwise as distinguished from the rotation of the drum as shown in Figure 1. The only other difference which exists between the modifications shown in Figures 1 and 2 is that in Figure 2 the suction discharger A is internally divided into a cake compartment 31 and a moisture trap or compartment 32 by means of a wall 33. The upper end of the wall 33 terminates in an adjustable gate 34 pivoted as at 35. The fluid current set up by the exhauster 36 serves not only to lift the cake from the filter medium or cloth but also to draw from the discharged cake a further quantity of the residual moisture associated with it and to segregate the cake and moisture by drawing the moisture over the trap 32.

It is to be noted that the mouth of the suction discharger A is comparatively restricted and that the walls of the discharger diverge. This construction effects an increase in the velocity of the fluid current as it passes between the two seals of the discharger and a decrease in velocity as the fluid current advances within the discharger. The increased velocity is effective in aiding the fluid current to lift the cake from the filter drum while the decreased velocity of the fluid current as it advances thru the discharger is effective in allowing the cake to drop by gravity into the seal box and in permitting the moisture to drop by gravity into the trap 32. Needless to say the segregation of the cake and moisture is effected by air classification as is apparent from a consideration of Figure 2. By moving the gate 34 about the pivot 35 its position may be adjusted so that substantially all of the moisture passes over the gate and into the moisture trap.

The construction of the seals between the discharger and drum has not been described with particular reference to Figure 2 for the construction is identical with that described in connection with Figure 1.

The following difference however is to be noted. In Figure 2 the upper seal engages a portion of the drum which has just been discharged while the lower seal engages the advancing cake about to be discharged. As has already been pointed out the direction of rotation of the drum in Figure 2 is reversed from the direction of rotation of the drum shown in Figure 1 and as a consequence the upper seal shown in Figure 1 engages the advancing cake while the lower seal engages that portion of the drum which has just been discharged. From this observation it will be noted that it is immaterial in which direction the drum is rotating. In both cases the fluid current passing thru the discharger first passes thru the drum compartment or section being discharged and is maintained in the path of the advancing cake.

A study of the action of the discharger both from a theoretical consideration as well as from observations made during commercial tests show that the point at which the cake is being discharged from the drum, moves thru a predetermined angle with respect to the mouth of the discharger. This is due to the presence of the division strips defining the sections or compartments on the drum. The air in any given section or compartment being discharged cannot pass to the adjacent compartment or section next to be discharged as long as the latter compartment is sealed by the intervening division strip and by a sheet of cake disposed over its upper surface. As soon as the sheet of cake has been partially stripped from the advancing compartment a fluid current will enter the advancing compartment and then pass outwardly thru the discharger. It will therefore be seen that the point or line of discharge or divergence between cake and drum oscillates between the two seals of the discharger.

In Figure 2 a baffle 22 has been shown as secured to the ceiling of the chamber A and is obviously for the purpose of preventing any discharged cake from entering the conduit 23 communicating with the exhauster 12.

Although the above disclosure has been limited to the embodiment of my invention in connection with externally fed rotary drum filters it is to be understood that a cake discharger embodying the principles above disclosed may be readily applied to internally fed filters such as for example the Dorco, rotary disc filters such as the American filter and endless ban filters.

It is also to be bore in mind that since the fundamental principle upon which the operation of my invention depends is that a fluid current be generated and maintained in the path of a cake advancing with and supported by a filter medium so that the cake must of necessity move into a fluid current having a direction of travel transverse to that of the cake, it is immaterial whether this fluid current is initiated by suction or pressure. For example it is readily conceivable that a fluid current having the above requirements could be set up by blowing a current of air inwardly thru a portion of a filter compartment already discharged and in then causing this current to pass outwardly thru the same compartment or the adjacent compartment to lift or discharge the cake from its supporting filter medium. In this connection the action of a fluid jet discharger which cuts the cake from the filter medium is to be distinguished from the fluid current as used in accordance with my invention which lifts the cake from the filter medium.

In Fig. 3 the connection between the chamber or passageway 15 and the source of liquid 16 appears on the upper face of the lip or seal 14 but when so constructed this connection does not necessarily fall within the suction chamber for the seal 14 can extend laterally beyond the suction chamber. Needless to say this connection if desired can readily be made on the under side of the seal or at one end.

I claim:

1. The method of continuously discharging a filter wherein a cake is continuously formed on a rotating filter element, comprising causing the filter element to cut thru a gaseous current drawn outwardly thru the filter element by any suitable source of vacuum to thereby lift the cake from said filter element.

2. In a filter comprising a traveling filter element, a suction nozzle external to said filter for creating an air current thru said element and in a direction opposite to the normal flow of the filtrate.

3. In a filter having a moving filter element, a discharge mechanism comprising suction means external to said filter for producing a gaseous current in the path of said rotating filter element.

4. In a continuous filter having a moving filter element, a discharge mechanism comprising means external to said filter for producing a gaseous current passing inwardly thru successively discharged portions of the filter and then outwardly thru and in the path of the portion of the filter being discharged to strip the cake therefrom.

5. In a continuous filter having a moving filter element, a discharge mechanism comprising suction means external to said filter and in communication with that portion of the filter element being discharged whereby a gaseous current can be produced in the path of said filter element to thereby strip the cake therefrom.

6. In a continuous filter having a sectionalized rotary drum filter element, a discharge mechanism comprising a suction chamber external to said filter and in communication with that portion of the filter element being discharged whereby a gaseous current can be produced in the path of said filter element to thereby strip the cake therefrom.

7. A discharge mechanism for continuous filters comprising a suction chamber having one edge sealed against the cake carried by and advancing with the filter element and means for drawing a gaseous current thru the suction chamber and thru that portion of the filter element immediately discharged and in the path of the advancing cake to thereby lift the cake from the filter element.

8. A discharge mechanism for continuous filters comprising a suction chamber having its forward edge sealed against the advancing cake and adapted to draw a gaseous current thru that portion of the filter element immediately discharged and in the path of the advancing cake.

9. A discharge mechanism for continuous filters comprising a suction chamber extending over the entire length of the filter medium and having its forward edge sealed against the advancing cake, said chamber being adapted to draw a fluid current in the path of the advancing cake and thru that portion of the filter element immediately discharged, a container also in communication with said chamber for receiving moisture separated from the discharged cake, said cake and moisture being separated by the classifying action of the fluid current.

10. A discharge mechanism for continuous filters comprising a suction chamber provided at one end with a suction nozzle and communicating at its opposite end with a source of vacuum, a cake receiving compartment depending from and in communication with an intermediate part of said chamber and a moisture trap also depending from and in communication with said chamber but intermediate said cake receiving compartment and said source of vacuum, said nozzle having its forward edge sealed against the advancing cake; the application of vacuum to the chamber operating to draw a fluid current thru that portion of the filter element immediately discharged and in the path of the advancing cake, to carry the discharged cake to the cake-receiving compartment and separate moisture from the discharged cake to carry it past the cake receiving compartment.

11. In a continuous filter having a moving filter element, discharge mechanism comprising an open ended suction chamber supported adjacent said filter element and having one edge of its open end resiliently sealed against the advancing cake carried by said filter element and having the opposite edge of said open end resiliently sealed against the receding discharged portion of said filter element.

12. In a continuous rotary drum filter of the type which rotates only partly submerged within a filter tank and about a horizontal axis, a discharge mechanism comprising a suction chamber disposed adjacent the upper exposed face of the filter drum.

13. In a continuous rotary drum filter of the type which rotates only partly submerged within a filter tank and about a horizontal axis, a discharge mechanism comprising an open ended suction chamber disposed adjacent the upper exposed face of the filter drum and having one edge of its open end sealed against the advancing cake carried by said drum.

In testimony whereof, I have hereunto set my hand.

GERALD O. HILLIER.